(12) United States Patent
Domesle et al.

(10) Patent No.: US 7,811,969 B2
(45) Date of Patent: Oct. 12, 2010

(54) METHOD FOR COATING A CATALYST CARRIER CONTAINING TWO DIFFERENT PARTIAL STRUCTURES WITH A CATALYTICALLY ACTIVE COATING, AND CATALYST OBTAINED THEREBY

(75) Inventors: Rainer Domesle, Alzenau-Kälberau (DE); Thomas Kreuzer, Karben (DE); Egbert Lox, Hochwaldhausen (DE)

(73) Assignee: Umicore AG & Co. KG, Hanau (DE)

( * ) Notice: Subject to any disclaimer, the term of this patent is extended or adjusted under 35 U.S.C. 154(b) by 1026 days.

(21) Appl. No.: 10/535,589

(22) PCT Filed: Nov. 4, 2003

(86) PCT No.: PCT/EP03/12298

§ 371 (c)(1),
(2), (4) Date: Nov. 30, 2005

(87) PCT Pub. No.: WO2004/047958

PCT Pub. Date: Jun. 10, 2004

(65) Prior Publication Data

US 2006/0154816 A1    Jul. 13, 2006

(30) Foreign Application Priority Data

Nov. 22, 2002 (DE) ................. 102 54 661

(51) Int. Cl.
*B01J 21/04* (2006.01)
(52) U.S. Cl. .................... 502/439; 427/282
(58) Field of Classification Search ............. 502/429; 428/357, 379, 389, 402, 403; 427/212, 213, 427/213.31, 214–217, 220, 226, 228, 229, 427/282, 314
See application file for complete search history.

(56) References Cited

U.S. PATENT DOCUMENTS

| 4,916,106 | A | * | 4/1990 | Koschlig et al. | ............. 502/309 |
|---|---|---|---|---|---|
| 5,139,993 | A | | 8/1992 | Schmidt | |
| 5,446,006 | A | | 8/1995 | Domesle | |
| 6,534,021 | B1 | * | 3/2003 | Maus | ......................... 422/180 |
| 6,712,884 | B2 | | 3/2004 | Bruck et al. | |
| 7,267,805 | B2 | | 9/2007 | Bruck et al. | |
| 2001/0003728 | A1 | | 6/2001 | Ito et al. | |
| 2001/0006717 | A1 | | 7/2001 | Domesle et al. | |
| 2003/0072694 | A1 | | 4/2003 | Hodgson et al. | |

FOREIGN PATENT DOCUMENTS

| DE | 4006346 | | 1/1992 |
|---|---|---|---|
| DE | 44 06 431 | A1 | 8/1995 |
| DE | 4406431 | A1 | 8/1995 |
| DE | 4406431 | C2 | 6/1996 |
| DE | 10060659 | | 7/2001 |
| DE | 19962544 | | 7/2001 |
| DE | 201 17 873 | U1 | 2/2002 |
| DE | 20117873 | | 1/2004 |
| JP | 01270948 | | 10/1989 |
| JP | 957241 | | 11/1999 |
| JP | 11324645 | | 11/1999 |
| JP | 2002180818 | | 6/2002 |
| WO | WO9523024 | | 8/1995 |

OTHER PUBLICATIONS

International Search Report.

* cited by examiner

*Primary Examiner*—Melvin C Mayes
*Assistant Examiner*—Melissa Stalder
(74) *Attorney, Agent, or Firm*—Kalow & Springut LLP; William D. Schmidt

(57) ABSTRACT

The invention relates to a process for the coating of a catalyst support with a catalytically active coat using a coating dispersion, the catalyst support containing at least two partial structures which differ in their absorptivity for the coating dispersion. The process is characterized in that the absorptivity of the partial structures is modified relative to one another by precoating of the catalyst support with a material which can be burnt out or with liquid, and the catalytic coat is then applied to the filter body in a known manner, dried and/or calcined.

12 Claims, No Drawings

METHOD FOR COATING A CATALYST CARRIER CONTAINING TWO DIFFERENT PARTIAL STRUCTURES WITH A CATALYTICALLY ACTIVE COATING, AND CATALYST OBTAINED THEREBY

BACKGROUND OF THE INVENTION

The present invention relates to a process for the coating of a catalyst support, which contains two different partial structures, with a catalytically active coat, and the catalysts obtained by this process.

Catalyst supports which contain two different partial structures are increasingly being used in the area of automotive exhaust gas catalysis. They are chiefly filter bodies for removing soot particles from the exhaust gas, in particular of diesel engines.

In the past, various filter types have been disclosed for this intended use. The so-called wall flow filters are widely used. These are monolithic filter bodies which have a cylindrical shape and through which parallel flow channels for the exhaust gas extend from the entry end face to the exit end face. The filter bodies consist of a uniform porous ceramic material and are produced, for example, by extrusion. In order to impose the filter effect, the flow channels are mutually closed at the entry and exit end faces so that the flow channels are divided into entry and exit channels and, on flowing through the filter body, the exhaust gas has to pass from the entry channels through the porous partitions between the channels into the exit channels. The soot particles contained in the exhaust gas are filtered out of the exhaust gas stream and deposited on the walls of the entry channels.

A further filter type is described, for example, in the documents DE 197 04 147 A1 and DE 201 17 873 U1. For retaining particles from a gas stream flowing through the filter body, the filter bodies of this filter type contain gas-impermeable first layers and gas-permeable second layers, which are arranged so that channels through which the exhaust gas can flow are formed. The gas-permeable second layers consist of porous filter mats, and the gas-impermeable first layers are provided with paddles which project into the channels through which flow can take place and direct the exhaust gas predominantly to the porous second layers and conduct it through these. A particular advantage of these filters is their lower tendency to blockage owing to soot deposits. These filters therefore contain two different partial structures, namely the porous filter mats and the gas-impermeable first layers. Filter bodies of this type are also referred to below as filter catalysts, in order to distinguish them from the wall flow filters.

In addition to the deposition and removal of soot particles from the exhaust gas, a catalytic treatment of the exhaust gas and/or of a component added to the exhaust gas, such as, for example, urea, is frequently desired. For this purpose, the filter can be catalytically coated. These coats may be oxidation-active coats which contain platinum and/or palladium as catalytically active components, or so-called soot ignition coats which contain, for example, cerium oxide and/or vanadium oxide. Coats having other catalytic effects, such as, for example, the storage of oxides of nitrogen and the selective catalytic reduction of oxides of nitrogen with ammonia, are likewise known.

The catalytic coats of these filters are preferably so-called dispersion coats in which the catalytically active components are present in highly disperse form on finely divided support materials, such as, for example, active alumina. This type of coats ensures optimum utilization of the catalytic potential of the catalytically active components. The support materials coated with the catalytically active components are referred to below as catalyst material.

For coating of the filter bodies, the catalyst material is first dispersed in a carrier liquid, generally water. For the coating, for example, the dispersion is then poured over the filter bodies or said filter bodies are immersed in the dispersion or the dispersion is sucked or pumped into the filter bodies. Excess coating dispersion is then removed by blowing out with compressed air or by sucking out. The coat is then dried and/or is calcined at temperatures between 300 and 900° C. In a preferred embodiment, the thermal treatment takes place at between 300 and 700° C. The techniques described here are known to the person skilled in the art in the area of automotive exhaust gas catalysis and therefore require no detailed explanation.

A substantial problem in the coating of filter catalysts is that their two partial structures have a different absorptivity for the coating dispersion. In the case of the filter catalysts, the greatest part of the coating dispersion applied to the filter body is deposited in the porous filter mat. The pores become blocked thereby and thus eliminate the filter effect. The filter body then acts only as a simple flow-through monolith with increased exhaust gas back-pressure.

SUMMARY OF THE INVENTION

It is an object of the present invention to overcome the problems and disadvantages of the prior art. Furthermore, it is intended to provide a process which makes it possible to coat a catalyst support which contains two different partial structures which are distinguished by a different absorptivity for the coating dispersion with a catalytically active coat, it being intended that the coat concentrations in the partial structures be adjustable substantially independently of one another. In particular, it is intended to avoid the situation where a porous partial structure of the catalyst support is impaired in its function or even rendered completely useless by excessive deposition of coating dispersion.

This object is achieved if the absorptivity of at least one partial structure is modified by precoating of the catalyst support, and the catalytic coat is then applied. Preferably, the absorptivity of the partial structures is modified relative to one another. In a preferred embodiment, the modification of the absorptivity is effected by pore filling, hydrophilic and/or hydrophobic treatment of the partial structure(s). The modification of the absorptivity is preferably effected by pore filling and/or hydrophobic treatment of partial structure(s). The application of the catalytic coat to the filter body is preferably effected in a known manner. After the application, the coat is dried and/or calcined. In a preferred embodiment, the drying and/or calcination is effected after the application of the catalytic material and after the precoating with at least one precoating medium.

DETAILED DESCRIPTION OF THE PREFERRED EMBODIMENTS

In a preferred embodiment according to the invention, the precoating medium is expelled during the thermal treatment for the catalytic coat. In a further preferred embodiment according to the invention, the expulsion of the precoating medium is effected by means of additional measures, such as, preferably, a further thermal treatment.

The precoating of the catalyst support is preferably effected with a precoating medium comprising at least one material which can be burnt out and/or at least one material which can be vaporized or evaporated.

A water-miscible liquid, a water-immiscible liquid or water is preferably used as the material which can be vaporized or evaporated.

Polyvinyl alcohol, wax or other hydrophobic substances are preferably used as material which can be burnt out. In a preferred embodiment of the invention, these are applied in dissolved form or as an emulsion and preferably dried before the application of the catalytic coat. In this way, the hydrophobic treatment is provided preferably on at least one partial structure.

Water-miscible liquids, such as alcohols, or water-immiscible organic liquids, such as hydrocarbons, are preferably used for the precoating and pore filling. Water is particularly preferably used.

The process is particularly suitable for the coating of so-called filter catalysts which are distinguished by two partial structures of different porosity and hence different absorptivity for the coating dispersion. A first partial structure of the filter catalyst contains, for example, a porous filter mat, and a second partial structure has a non-porous, for example smooth, metal foil.

The precoating of the catalyst support is preferably effected by bringing the latter into contact with at least one precoating medium.

The precoating of the catalyst support is preferably effected by immersion in water or liquid wax. As a result of this, the pores of the porous partial structure are partly or completely filled with the precoating liquid so that, during the subsequent coating, the coating dispersion can no longer penetrate into the depth of the porous partial structure. The partial filling can be adjusted by corresponding blowing out or drying on after the catalyst support has been completely immersed. A further, particularly suitable process comprises absorption, in which the body is placed with one end face in a liquid and said liquid rises selectively in the porous partial structure of the catalyst support by means of capillary forces. As a result of this measure, the absorptivity of the two partial structures for the coating dispersion can be modified relative to one another in a targeted manner.

In a particularly preferred embodiment of the invention, the at least one precoating medium comprises a catalytically active material or a precursor thereof.

The catalytically active material or the precursor thereof remains at least on the at least one partial structure, preferably the porous partial structure, after the expulsion and thus forms an additional catalytic coat. In a preferred embodiment according to the invention, in the case of precoating of a catalyst support having two partial structures with water, cerium nitrate is added to the water and, after application of the coating dispersion, preferably to the non-porous partial structure, remains behind or in the porous partial structure after drying and/or calcination in the form of cerium oxide. Thus, it is possible to form a catalyst which has coatings of different composition and/or function on at least one partial structure and/or on the partial structures.

In coating tests with filter catalysts which have a nonwoven fabric with different fibre diameters as a porous partial structure and corrugated metal foils as the second, non-porous partial structure, it was determined that, in the case of nonwoven fabrics with fibre diameters of 22 µm, 95% of the total coating material were deposited in the nonwoven fabric and only 5% on the metal foil. In the case of nonwoven fabrics with only 12 µm fibre diameter, the ratio was 98% to 2%.

By precoating the filter catalyst with water, it is possible to ensure that not more than 80, preferably not more than 50 and particularly preferably not more than 30% of the total coating material are deposited on the nonwoven fabric. This prevents the filter function of the porous partial structure of the filter catalyst from being destroyed by the coating.

What is claimed is:

1. Process for the coating of a catalyst support with a catalytically active coat using a coating dispersion, the catalyst support containing at least two partial structures which differ in their absorptivity for the coating dispersion, where the absorptivity of at least one partial structure is modified by precoating of the catalyst support and the catalytic coat is then applied, wherein the catalyst support is a filter catalyst support, which has a porous filter mat as a first partial structure and a non-porous metal foil as a second partial structure.

2. Process according to claim 1, where the precoating is effected with a material which can be burnt out, evaporated, vaporized or a combination thereof.

3. Process according to claim 2, where polyvinyl alcohol, wax or a wax emulsion is used as the material which can be burnt out.

4. Process according to claim 2, where the precoating is effected with water.

5. Process according to claim 2, where the precoating is effected with a water-miscible liquid.

6. Process according to claim 5, where alcohols are used as the water-miscible liquid.

7. Process according to claim 2, where the precoating is effected with a water-immiscible organic liquid.

8. Process according to claim 7, where hydrocarbons are used as the water-immiscible organic liquid.

9. Process according to claim 1, where the precoating medium comprises catalytically active material and/or a precursor thereof.

10. Process according to claim 1, where the precoating is effected by immersion of the catalyst support in a precoating medium or by absorption of a precoating medium into the catalyst support.

11. Process according to claim 1, where the catalytic coat is dried and/or calcined after application.

12. A coated catalyst support which is produced by a process according to claim 1.

* * * * *